US012609909B2

(12) United States Patent
Grover et al.

(10) Patent No.: US 12,609,909 B2
(45) Date of Patent: Apr. 21, 2026

(54) TRAINING MACHINE LEARNING ALGORITHM(S) TO IDENTIFY LEAKS OF SENSITIVE INFORMATION

(71) Applicant: MICRO FOCUS LLC, Wilmington, DE (US)

(72) Inventors: Douglas Max Grover, Rigby, ID (US); Michael F. Angelo, Houston, TX (US); Michael A. Aday, Carrollton, TX (US)

(73) Assignee: Micro Focus LLC, Austin, TX (US)

( * ) Notice: Subject to any disclaimer, the term of this patent is extended or adjusted under 35 U.S.C. 154(b) by 93 days.

(21) Appl. No.: 18/428,304

(22) Filed: Jan. 31, 2024

(65) Prior Publication Data

US 2025/0247364 A1     Jul. 31, 2025

(51) Int. Cl.
H04L 29/06          (2006.01)
H04L 9/40           (2022.01)

(52) U.S. Cl.
CPC ...... H04L 63/0245 (2013.01); H04L 63/0263 (2013.01); H04L 63/105 (2013.01)

(58) Field of Classification Search
None
See application file for complete search history.

(56) References Cited

U.S. PATENT DOCUMENTS 11,775,347 B2 * 10/2023 Cheng ...................... G06N 5/04
                                                713/176
12,316,647 B1 * 5/2025 Pierce, Jr. ............... H04L 63/20

| | | | | |
|---|---|---|---|---|
| 12,341,782 | B2 * | 6/2025 | Mohan .................. | H04L 63/102 |
| 2005/0038788 | A1 * | 2/2005 | Dettinger ............ | G06F 21/6227 |
| 2015/0242639 | A1 * | 8/2015 | Galil ....................... | G06F 21/60 726/1 |
| 2021/0157933 | A1 * | 5/2021 | Turano .................. | G06F 21/604 |
| 2023/0252190 | A1 * | 8/2023 | Mossoba ............. | G06F 21/6254 726/26 |
| 2024/0022570 | A1 * | 1/2024 | Rose ....................... | H04L 63/10 |
| 2024/0411865 | A1 * | 12/2024 | Bitton .................. | G06F 21/552 |
| 2024/0412550 | A1 * | 12/2024 | Tsibulevskiy ......... | G06F 3/0484 |
| 2025/0030438 | A1 * | 1/2025 | Cooper .............. | H03M 7/3059 |
| 2025/0062911 | A1 * | 2/2025 | Ranjbar Alvar ........ | G06F 21/16 |
| 2025/0165755 | A1 * | 5/2025 | Gates .................. | G06N 3/0475 |
| 2025/0200222 | A1 * | 6/2025 | Monaco .............. | G06F 40/284 |

FOREIGN PATENT DOCUMENTS

| | | | | |
|---|---|---|---|---|
| EP | 4478231 A1 * | 12/2024 | ............ | G10L 15/26 |
| EP | 4546710 A1 * | 4/2025 | .......... | G06F 21/554 |

* cited by examiner

*Primary Examiner* — Jeffery L Williams

(74) *Attorney, Agent, or Firm* — Sheridan Ross P.C.

(57)          ABSTRACT

A trained machine learning algorithm receives input data that may contain sensitive information. For example, the input data may be top secret military specifications that are sent as an attachment in an email that is being sent outside of a government computer network. The trained machine learning algorithm is trained with one of: sensitive training data or insensitive training data (or there may be two trained machine learning algorithms where one is trained with the sensitive training data and one is trained with the insensitive training data). The trained machine learning algorithm determines whether the input data contains the sensitive information. In response to determining that the input data contains the sensitive information, an action is taken to prevent release of the input data. For example, the action may be to block the sending of the email.

20 Claims, 8 Drawing Sheets

TRAINING MACHINE LEARNING ALGORITHM(S) TO IDENTIFY LEAKS OF SENSITIVE INFORMATION

FIELD

The disclosure relates generally to information security in computer networks and particularly to using machine learning algorithms to identify leaks of sensitive information in computer networks.

BACKGROUND

One of the issues with sensitive information is that it can be leaked outside of a secure computer network in various ways. For example, sensitive information may be leaked in documents, in emails, via input to AI algorithms, via audio information, via a communication session, via images, and/or the like. While there are some solutions in this area, such as using keywords, the ability to identify leaks of sensitive information outside a secure network is still not optimal and is still difficult to detect and prevent.

SUMMARY

These and other needs are addressed by the various embodiments and configurations of the present disclosure. The present disclosure can provide a number of advantages depending on the particular configuration. These and other advantages will be apparent from the disclosure contained herein.

A trained machine learning algorithm receives input data that may contain sensitive information. For example, the input data may be top secret military specifications that are sent as an attachment in an email that is being sent outside of a government computer network. The trained machine learning algorithm is trained with one of: sensitive training data or insensitive training data (or there may be two trained machine learning algorithms where one is trained with the sensitive training data and one is trained with the insensitive training data). The trained machine learning algorithm determines whether the input data contains the sensitive information. In response to determining that the input data contains the sensitive information, an action is taken to prevent release of the input data. For example, the action may be to block the sending of the email.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein, the terms "Artificial Intelligence (AI) algorithm and Machine Learning (ML) algorithm may be used interchangeably.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
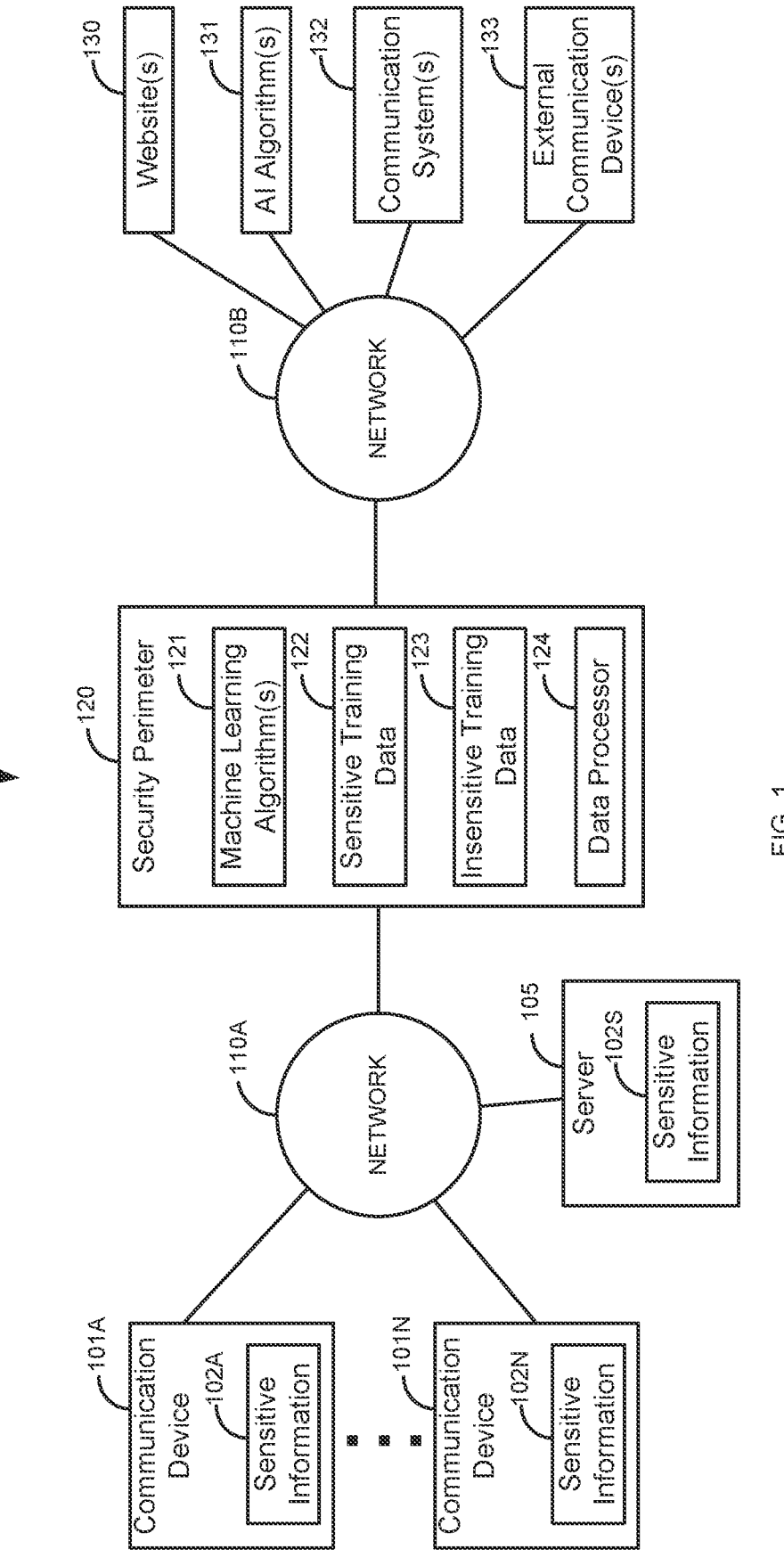
FIG. 1 is a block diagram of a first illustrative system for training a Machine Learning (ML) algorithm to identify leaks of sensitive information.

FIG. 1 is a block diagram of a first illustrative system 100 for training a Machine Learning (ML) algorithm 121 to identify leaks of sensitive information 102. The first illustrative system 100 comprises communication devices 101A-101N, a server 105, networks 110A-110B, a security perimeter 120, website(s) 130, AI algorithm(s) 131, communication system(s) 132, and external communication device(s) 133.

The communication devices 101A-101N can be or may include any device that can communicate on the network 110A, such as a Personal Computer (PC), a telephone, a video system, a cellular telephone, a Personal Digital Assistant (PDA), a tablet device, a notebook device, a laptop computer, a smartphone, a communication system (e.g., an email server), an embedded device, and/or the like. As shown in FIG. 1, any number of communication devices 101A-101N may be connected to the network 110, including only a single communication device 101.

The communication devices 101A-101N further comprise sensitive information 102A-102N. The sensitive information

102A-102N can be or may include any information that should not be released outside the network 110A, such as trade secret information, computer source code, government documents, database information, contract information, corporate lists of customers, military secrets, financial information, vocabulary specific to a company that is associated with sensitive information, acronyms for sensitive information, employee names/locations, human resource records, and/or the like.

The server 105 is any server/device that can host sensitive information 102S. The server 105 may be a database server, a web server, an application server, a security server, a source code repository, a human resource server, a financial server, and/or the like. The server 105 further comprises sensitive information 102S. The sensitive information 102S may be any sensitive information 102 that is located on the server 105. The sensitive information 102S may be the same/similar to the sensitive information 102A-102N.

The network 110A is typically a private network. The network 110A can be or may include any collection of communication equipment that can send and receive electronic communications, such as a Wide Area Network (WAN), a Local Area Network (LAN), a packet switched network, a corporate network, a government network, a household network, and/or the like. The network 110A can use a variety of electronic protocols, such as Ethernet, Internet Protocol (IP), Hyper Text Transfer Protocol (HTTP), Web Real-Time Protocol (Web RTC), and/or the like. Thus, the network 110A is an electronic communication network configured to carry messages via packets and/or circuit switched communications.

The network 110B is similar to the network 110A except that the network 110B is typically a public network, such has, the Internet, a cellular network, another corporate network, another government network, a combination of these, and the like. Likewise, the network 110B can use a variety of electronic protocols, such as Ethernet, Internet Protocol (IP), Hyper Text Transfer Protocol (HTTP), Web Real-Time Protocol (Web RTC), and/or the like. Thus, the network 110B is also is an electronic communication network configured to carry messages via packets and/or circuit switched communications.

The security perimeter 120 may be any device that separates the network 110A from the network 110B, such as a firewall, a network address translator, a proxy server, a gateway, a security application, and/or the like. The security perimeter 130 further comprises machine learning algorithm(s) 121, sensitive training data 122, insensitive training data 123, and a data processor 124.

The machine learning algorithm(s) 121 may be any type of machine learning algorithm 121 that can be trained using the sensitive training data 122 and/or the insensitive training data 123, such as a supervised machine learning algorithm, a semi-supervised machine learning algorithm, an unsupervised machine learning algorithm, a reinforcement machine learning algorithm, and/or the like.

The sensitive training data 122 may be any type of data that contains the sensitive information 102. The sensitive training data 122 is used to train the machine learning algorithm 121 to identify the sensitive information 102. The sensitive training data 122 may include vocabulary specific to a company, acronyms specific to a company, data specific to a company, employee names/locations, and/or the like.

The insensitive training data 123 may be any type of data that contains insensitive information. The insensitive training data 123 is used to train the machine learning algorithm 121 to identify sensitive information 102. The insensitive training data 123 may be any data that is not sensitive information. For example, the insensitive training data 123 may comprises released corporate documents, example emails with insensitive information, documents with insensitive information, corporate material that is public knowledge, and/or the like.

The data processor 124 may be any hardware coupled with software that can process (e.g., capture) the sensitive information 102 as the comes into the security perimeter 120. The data processor 124 is used to capture the input data and provide the input data to the machine learning algorithm(s) 121 to identify if sensitive information 102 is being attempted to be leaked outside of the security perimeter 120. The data processor 124 may take various actions based on the identification of the sensitive information 102 being leaked outside the security perimeter 120.

Although not shown in FIG. 1, parts of the security perimeter 120 may be distributed on the network 110A. For example, the sensitive training data 122 and/or the insensitive training data 123 may reside on the server 105 or on a communication device 101.

The website(s) 130 may be any website 130 on the network 110B, such as a search engine website, a financial application website, a social media site, a dark website, a database application, and/or the like.

The AI algorithm(s) 131 may be any type of AI algorithm 131 that can be accessed by the communication devices 101A-101N, such as ChatGPT, GitHub Copilot, Tensor Flow, OpenAI, AskCodi, Durable, Kaiber AI, and/or the like. The AI algorithm(s) 121 may be any type of AI algorithm, such as neural network AI algorithm, a code generation AI algorithm, a supervised learning AI algorithm, an unsupervised learning AI algorithm, a reinforcement learning AI algorithm, and/or the like.

The communication system(s) 132 may be any type of communication system, such as an email system, a voice communication system, a video communication system, a chat system, a cellular communication system, a Private Brach Exchange (PBX), and/or the like. The communication system(s) 132 may be used to establish a communication session between different communication devices (e.g., 101A-101N/133).

The external communication device(s) 133 may be any type of device that can be used to establish a communication session. For example, the external communication device(s) 133 may be a type of communication device 101.

Figure 2:
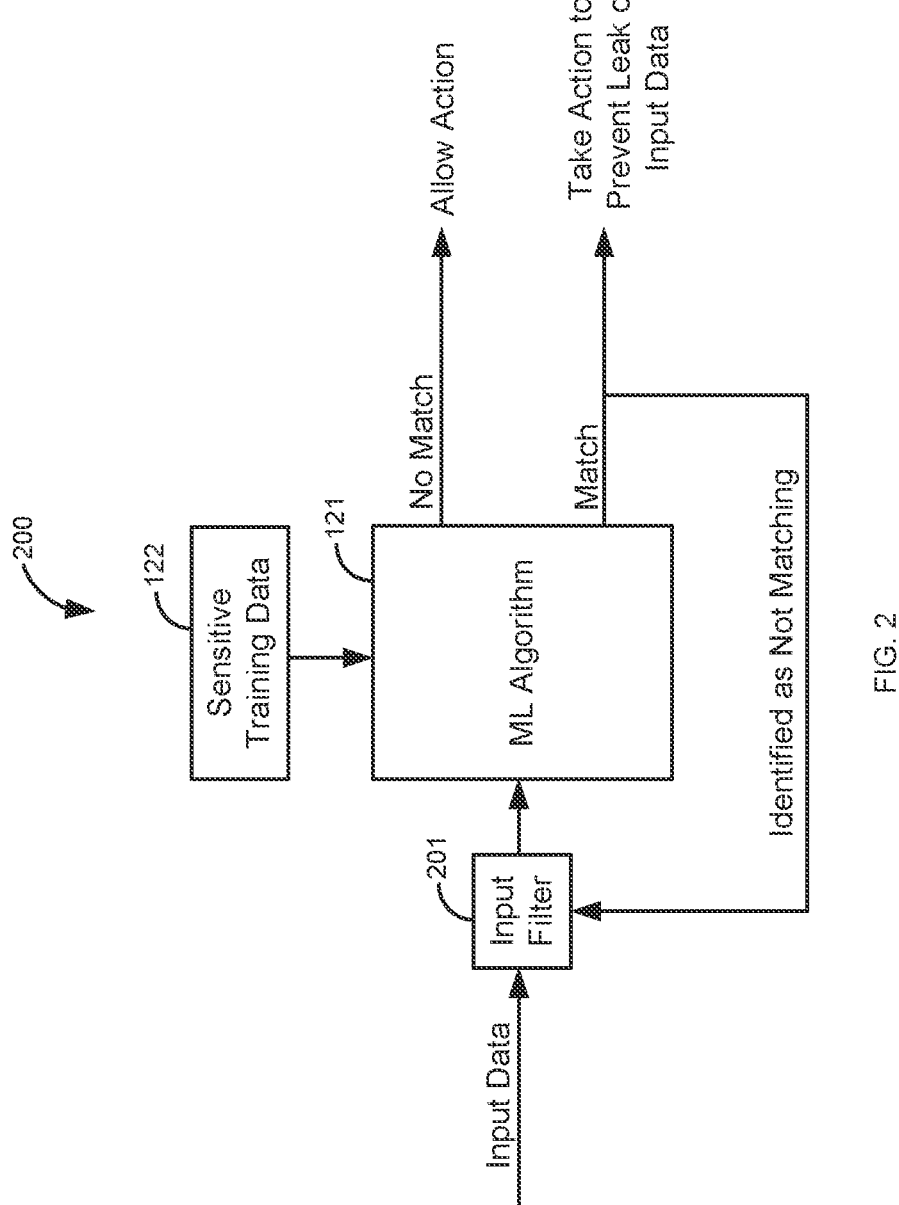
FIG. 2 is a block diagram of a second illustrative system for training a ML algorithm to identify leaks of sensitive information using sensitive training data.

FIG. 2 is a block diagram of a second illustrative system 200 for training a ML algorithm 121 to identify leaks of sensitive information 102 using sensitive training data 122. The second illustrative system 200 comprises the ML algorithm 121, the sensitive training data 122, and an input filter 201.

In FIG. 2, the ML algorithm 121 is trained using the sensitive training data 122 to identify leaks of the sensitive information 102. When data is going to be released outside of the network 110A (e.g., a corporate network), the data (could be text, video, audio (e.g., a live conversion or audio file/stream), image information, etc.) is input to the trained ML algorithm 121. The trained ML algorithm 121 determines if the input data is and/or has sensitive information 102 based on the trained sensitive training data 122. For example, the input data may be sensitive information 102 intercepted by the data processor 124 that a user is trying to paste or upload to the website 130.

If the input data is deemed to be the sensitive information 102, an action is taken to prevent the leak of the sensitive information 102 (and/or to prevent future leaks). The action may be to prevent the leakage of the sensitive information 102, to alert a security analyst, to alert the user of the potential leak of sensitive information 102, to drop a user from a voice/video communication, and/or the like. If the input data is deemed to not be sensitive information 102, the action is allowed.

If the matched input data (determined to have sensitive information 102 by the ML algorithm 121) is later deemed to not be sensitive information 102, (e.g., a security analyst later identifies the matched input data as not being sensitive information 102), the misidentified input data may be flagged and stored off. This information may be learned and used to filter out misidentified matches in the future. For example, the misidentified input data may be feedback and used by the input filter 201 to filter out the same type of input data and/or similar type of input data to the ML algorithm 121 so that the ML algorithm 121 does not misidentify the same input data or similar input data incorrectly in the future.

Figure 3:
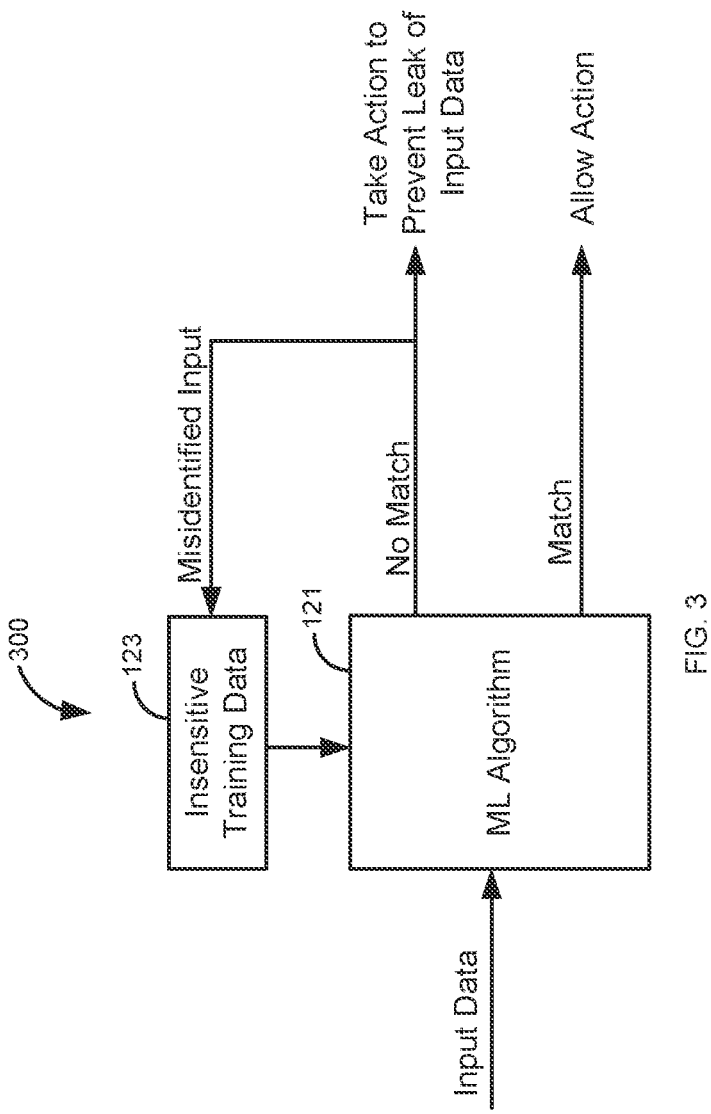
FIG. 3 is a block diagram of a third illustrative system for training a ML algorithm to identify leaks of sensitive information using insensitive training data.

FIG. 3 is a block diagram of a third illustrative system 300 for training a ML algorithm 121 to identify leaks of sensitive information 102 using insensitive training data 123. The third illustrative system 300 comprises the AI algorithm 131 and the insensitive training data 123.

Instead of training on the sensitive training data 122, in FIG. 3 the ML algorithm 121 is trained with the insensitive training data 123. The input data is then fed into the ML algorithm 121. If there is a match, the action is allowed. If there is not a match, an action is taken to prevent the leak of the sensitive information 102.

If the input data to the trained ML algorithm 121 does not match the insensitive training data 123 (is deemed to be or contain sensitive information 102), but the input data was misidentified, this information can be feedback to the insensitive training data 123. The misidentified input data can then be added to the insensitive training data 123. The updated insensitive training data 123 can then be used to retrain the ML algorithm 121.

Figure 4:
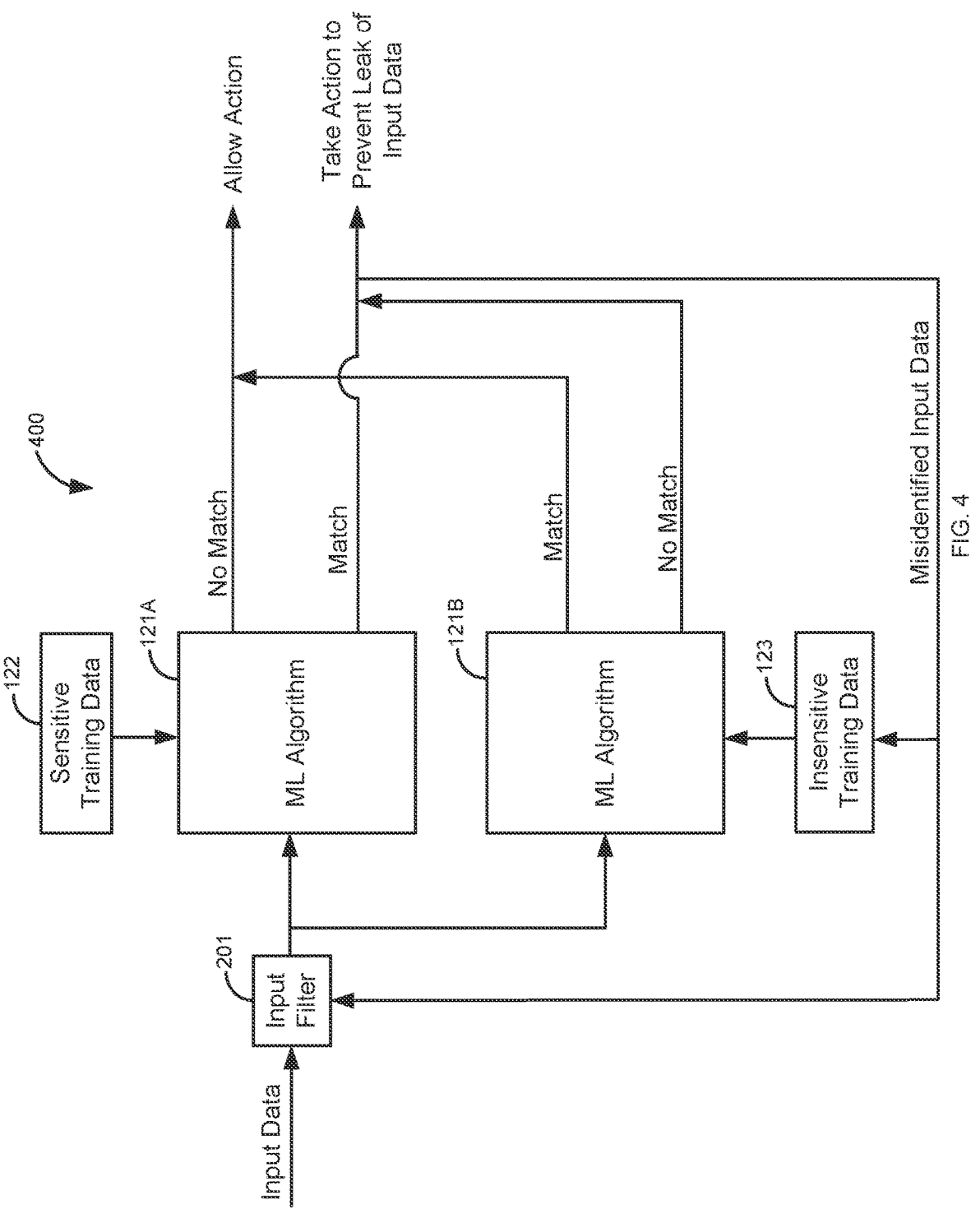
FIG. 4 is a block diagram of a fourth illustrative system for training a ML algorithm to identify leaks of sensitive information using both sensitive training data and insensitive training data.

FIG. 4 is a block diagram of a fourth illustrative system 400 for training a ML algorithm 121 to identify leaks of sensitive information 102 using both sensitive training data 122 and insensitive training data 123. The fourth illustrative system 400 comprises ML algorithms 121A-121B, the sensitive training data 122, the insensitive training data 123, and the input filter 201.

FIG. 4 combines the processes described in FIGS. 2-3. In FIG. 4, there are two trained ML algorithms 121A and 121B. ML algorithm 122A is trained using the sensitive training data 122 and the ML algorithm 121B is trained using insensitive training data 123. If there is a no match from the ML algorithm 122A (that is looking for sensitive information 102) and there is a match for the trained ML algorithm 122B (that is looking for insensitive information), the action is allowed. If there is a match for the ML algorithm 121A and/or not a match for the ML algorithm 121B (there is sensitive information 102) an action is taken to prevent the leak of the sensitive information 102.

For FIGS. 2-4 (and also FIG. 5), the matching/not matching out of the AI algorithm(s) 121 may be a likelihood of a match. In this example, a threshold may be used to determine if there is a match/no match. For example, if the threshold is 0.75 (for a range of 0-1), an AI algorithm output value of 0.76 would indicate that there is a match for that type of training data. For FIG. 4, both outputs may be averaged when comparing to the threshold. The appropriate threshold value may be adjusted/learned over time based on whether the detection of the sensitive information 102 is working properly.

The processes described above and herein may be used for documents, emails, videos, audio information, chats, text messaging, images, communication sessions, and/or the like. For example, if a document is sent via email, the information in the document and email may be input into the ML algorithm(s) 121A-121B as described above. For audio, the audio can be converted to text. The machine learning algorithm(s) 121 may be trained using images (e.g., schematic diagrams). This also improves upon the process of traditional parsing algorithms that can only deal with text. By using one or more ML algorithms 121, more sophisticated leaks of information can be detected than can be accomplished using traditional parsing methods.

In one embodiment, portions of the input data may be analyzed separately. For example, the text of the email may be fed into the AI algorithm 121 and then the attachment may be fed into the AI algorithm 121.

If there is misidentified input data (e.g., a network analyst determines that the input data was misidentified), the input data can be feed back to the insensitive training data 123. The ML algorithm 121B can then be retrained using the updated insensitive training data 123. The input data may also be feed back to the input filter 201 so that input data can be filtered to remove input data that results in misidentified input data. In one embodiment, the feedback can use one or both of these techniques (retraining the machine learning algorithm 121 and/or filtering the input data).

This process of determining which technique to use may be based which ML algorithm(s) 121A-121B misidentified the input data. For example, if the ML algorithm 121A misidentified the input data (said there was a match), the misidentified input data may be sent to the input filter 201. If the ML algorithm 121B misidentified the input data (said it was not a match) the input data may be sent to the insensitive training data 123. In one embodiment, the misidentified input data may be sent to both the input filter 201 and the insensitive training data 123.

Figure 5:
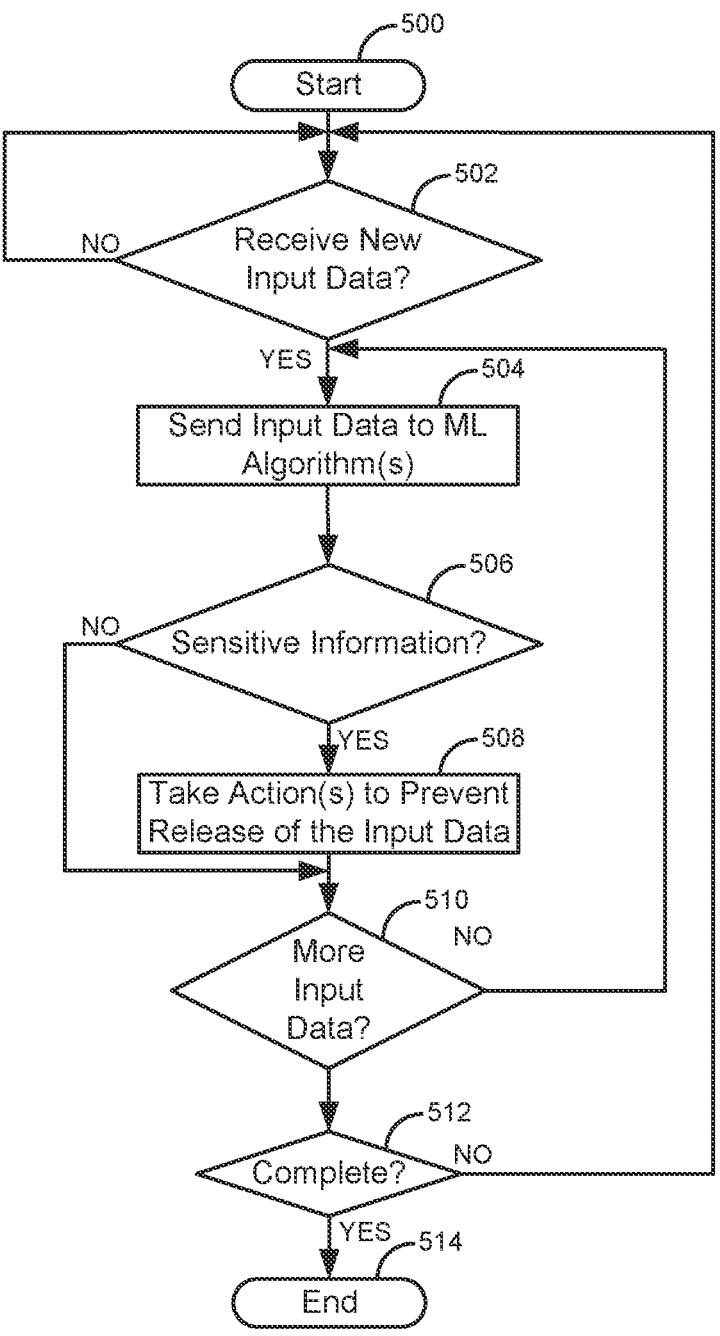
FIG. 5 is a flow diagram for identifying leaks of sensitive information using one or more ML algorithms.

FIG. 5 is a flow diagram for identifying leaks of sensitive information 102 using one or more ML algorithms 121. Illustratively, the communication devices 101A-101N, the sensitive information 102, the server 104, the security perimeter 120, the machine earning algorithm(s) 121, the sensitive training data 122, the insensitive training data 123, the data processor 124, the website(s) 130, the AI algorithm(s) 131, the communication system(s) 132, and the external communication devices 133 are stored-program-controlled entities, such as a computer or microprocessor, which performs the method of FIGS. 5-8 and the processes described herein by executing program instructions stored in a computer readable storage medium, such as a memory (i.e., a computer memory, a hard disk, and/or the like). Although the methods described in FIGS. 5-8 are shown in a specific order, one of skill in the art would recognize that the steps in FIGS. 5-8 may be implemented in different orders and/or be implemented in a multi-threaded environment. Moreover, various steps may be omitted or added based on implementation.

The process starts in step 500. The data processor 124 determines, in step 502, if new input data (data that is going to be sent outside the security perimeter 130) has been received. If new input data has not been received in step 502, the process of step 502 repeats.

Otherwise, if there is new input data in step 502, the data processor 124 sends the new input data to the ML algorithm(s) 121 (e.g., as described in FIGS. 2-4) in step 504. The ML algorithm(s) 121 determine, in step 506, if the input data comprises sensitive information 102. The input data may come from various sources, such as text, voice, video, documents, attachments, and/or the like. For example, a user may be speaking in a voice call between the communication device 101A and the external communication device 133.

If the input data does not contain the sensitive information 102 in step 506, the process goes to step 510. Otherwise, if the input data contains the sensitive information 102 in step 506, the data processor 124 takes an action to prevent the release of the sensitive information 102 in step 508. The action to prevent the release of the input data may comprise an action to: prevent leakage of the input data, alert a security analyst, alert a user providing the input data, drop the user from a communication session, drop a communication session, block a port on a firewall, delete the sensitive information 102 from a document, remove the document, delete an email, delete the input data from the email, blackout the input data, encrypt the input data, prevent printing of the input data, filter out the input data in an audio stream, have the an analyst review the sensitive information 102 and then allow the release of the sensitive information 102, determine, from a list, that the sensitive information 102 can be released based on a context (e.g., to a specific user/at a specific time), and/or the like.

The process then goes to step 510. In step 510, the data processor 124 determines, in step 510, if there is any more input data in step 510. For example, the data processor 124 may monitor the input data in real-time as a user types the input data into a specific website 130 or is speaking in a voice or video communication session. If there is more input data (e.g., the user is still logged into the website 130), the process goes back to step 504.

Otherwise, the process goes to step 512 to determine if the process is complete. If the process is not complete in step 512, the process goes back to step 502 to wait for new input data (e.g., input data input on a different website 130, input data to the AI algorithm 131, input data to a communication system 132, input data to an external communication device 133, and/or the like). If the process is complete in step 512, the process ends in step 514.

The process of FIG. 5 may be done in parallel for multiple communication sessions. For example, the process of FIG. 5 may be capturing input data from a first user accessing an AI algorithm 131 and second user have a voice communication session with an external communication device 133 at the same time. One way to accomplish monitoring parallel communication sessions is to spin off separate threads of the process of FIG. 5.

While the process of FIG. 5 (and the processes herein) are described with a single level of sensitivity, in one embodiment, there may be multiple layers of sensitivity. For example, a lower layer of sensitivity (e.g., that can be released based on a context) and a higher layer of sensitivity (e.g., that cannot be released outside of the security perimeter. For example, the context for the lower level may be that the sensitive information 102 may be released to a subsidiary of a company, but not to anyone else.

Figure 6:
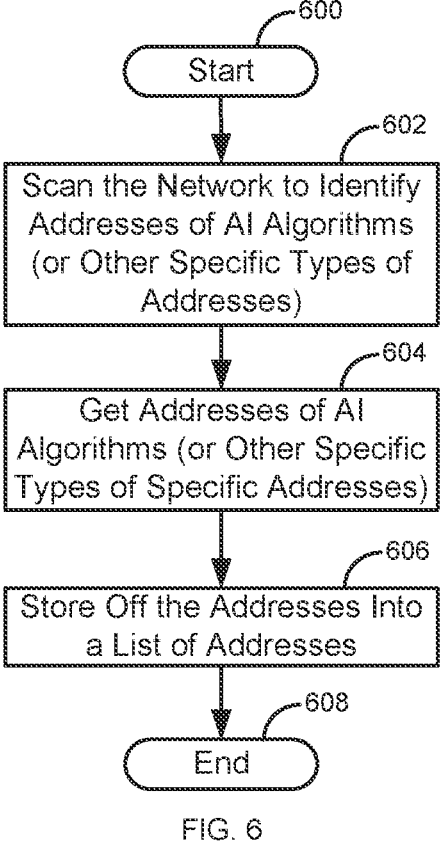
FIG. 6 is a flow diagram of a process for identifying addresses of AI algorithms or other identified addresses to prevent leaks of sensitive information.

FIG. 6 is a flow diagram of a process for identifying addresses of AI algorithms 131 or other identified addresses to prevent leaks of sensitive information 102. The process starts in step 600. The data processor 124 scans the network 110B (could also be network 110A), in step 602, to identify addresses of AI algorithms 131 or other specific types of addresses. For example, the data processor 124 may scan the network 110B to identify Universal Resource Locators (URLs)/Internet Protocol (IP) addresses of different AI algorithms 131. Alternatively, or in addition, the data processor 124 may scan for specific types of addresses, such as social media websites, source code repositories, dark web sites, and/or the like.

The data processor 124 get the addresses of the AI algorithm(s) 131 and/or other specific types of addresses in step 604. For example, the data processor 124 may get the addresses (e.g., URLs) of the AI algorithm(s) 131 and addresses of a specific type of communication systems 132 (e.g., addresses of email systems). The data processor 124 stores off the addresses in step 606 (e.g., in a list of addresses). The addresses may be sorted into different addresses of a specific type. For example, the addresses may be stored based on AI algorithms 131, based on specific types of web sites (e.g., source code repositories), and/or the like. The process then ends in step 608.

Figure 7:
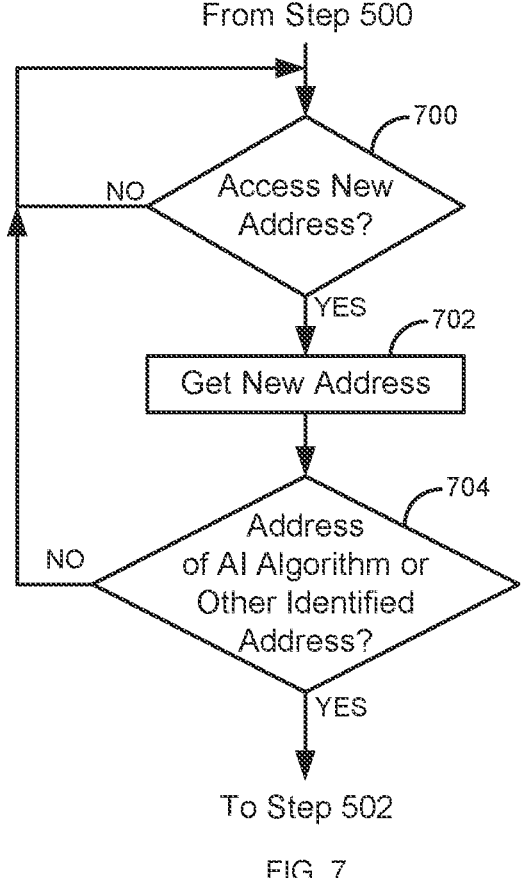
FIG. 7 is a flow diagram of a process for identifying addresses of AI algorithms or other identified addresses to prevent leaks of sensitive information.

FIG. 7 is a flow diagram of a process for identifying addresses of AI algorithms 131 or other identified addresses to prevent leaks of sensitive information 102. The process of FIG. 7 goes between step 500 and step 502 of FIG. 5. After starting in step 500, the data processor 124 determines, in step 700, if there is an attempt to access a new address (e.g., an address of a new AI algorithm 131). If there is not an attempt to access a new address, the process of step 700 repeats.

Otherwise, if there is an attempt to access a new address in step 700 (e.g., access a new website 130), the data processor 124 gets the new address (e.g., a new IP address) in step 702. The data processor 124 determines, in step 704 if the new address matches the address(es) of the AI algorithms 131 or other identified address stored off in step 606. The address(es) in the list may be filtered based on rules, user defined rules, and/or the like. If there is not an address in the list, the process goes back to step 700 and repeats the process. Otherwise, the process goes to step 502.

The process of FIG. 7 may work in the opposite manner. For example, the list may be a list of valid addresses (a whitelist). If an address is not valid, the process then goes to step 502 to determine is sensitive information 102 is being leaked.

Figure 8:
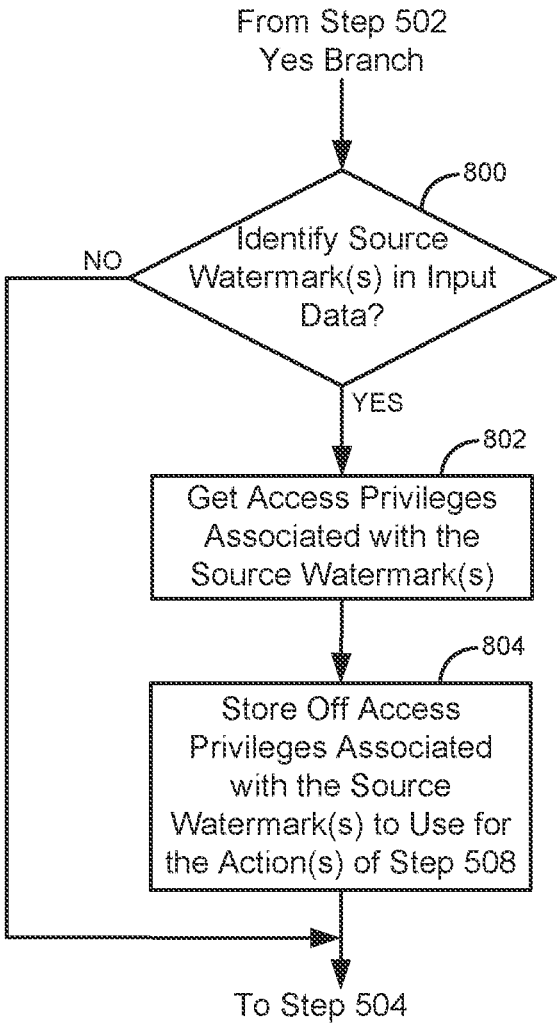
FIG. 8 is a flow diagram of a process for identifying source watermarks in input data to identify associated access privileges.

FIG. 8 is a flow diagram of a process for identifying source watermarks in input data to identify associated access privileges. FIG. 8 goes between steps 502 (yes branch) and step 504.

The process of FIG. 8 uses what are called source watermarks. A source watermark is where different versions of the same sensitive information 102 contain different watermarks to identify a source of the sensitive information 102. For example, there may be three copies of a sensitive document that are given to three different users. Each copy is identical, except that each has a different watermark contained within the document. Thus, if one of the three copies of the document are attempted to posted to the website 130, the process can identify the source of the document (i.e., the user who received the copy with the specific source watermark). The source watermark(s) may be in various locations within the input data/documents as is known in watermarking.

After determining that new input data has been received in step 502, the data processor 124 identifies if there are any source watermark(s) in the input data in step 800. If there are not any source watermark(s) in the input data, in step 800, the process goes to step 504.

Otherwise, if there are identified source watermark(s) in step 800, the data processor 124 gets the access privileges associated with the source watermark(s) in step 802. For example, the source watermark may be in a document that is sent in an email from the user to another user at the external communication device 133. The privileges associated with the source watermark may indicate that particular user can share this sensitive document outside the security perimeter 120. Thus, instead of taking an action to prevent the release of the email/document, the data processor 124 allows the sending of the email. The privileges may be based on various criteria. For example, the user can only send the sensitive information 102 via email to a particular user, the user can only send the sensitive information 102 to a particular IP address or group of IP addresses, the user can only send the sensitive information to his home address or to his home email address, the user can send the sensitive information to a particular AI algorithm 131 or source code repository, and/or the like.

The access privileges are then stored off in step 804 to use in determining what action(s) to take in step 508. The process then goes to step 504.

The process of FIG. 8 may use an AI algorithm to identify the source watermark(s). For example, the AI algorithm may be trained using the source watermarks to identify the source watermark(s) in the input data.

The processes described herein may be used with traditional keyword/parsing techniques to enhance the detection of leaks of sensitive information 102. For example, the matching/not matching of the ML algorithm(s) 121 of FIGS. 2-4 may also use traditional keyword/parsing techniques to further refine if there is a match or not.

The processes described herein could also work as a Software as a Service (SaaS). For example, each tenant can provide their own training data to train the machine learning algorithm(s) 121 and have a separate tenant partition that is used to identify leaks of the sensitive information 102.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

As described herein and in the claims, the term "machine learning" may include various types of machine learning, such as, supervised machine learning, unsupervised machine learning, semi-supervised machine learning, reinforced machine learning, and/or the like. Machine learning may include various types of Artificial Intelligence (AI) algorithms.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
a microprocessor; and
a computer readable medium, coupled with the microprocessor and comprising microprocessor readable and executable instructions that, when executed by the microprocessor, cause the microprocessor to:
    receive, by a trained machine learning algorithm, input data,
    wherein the input data comprises sensitive information and
    wherein the trained machine learning algorithm is trained with at least one of:
      sensitive training data; and
      insensitive training data;
    determine, by the trained machine learning algorithm, that the input data contains the sensitive information; and
    in response to determining that the input data contains the sensitive information, take an action to prevent release of the input data,
    wherein the input data is to be input into an Artificial Intelligence (AI) algorithm and
    wherein the microprocessor readable and executable instructions further cause the microprocessor to:
    determine if an address is a known address of the AI algorithm; and
    in response to determining whether the address is the known address of the AI algorithm, capturing the input data before the input data is sent to the AI algorithm.

2. The system of claim 1, wherein the microprocessor readable and executable instructions further cause the microprocessor to:
    identify if at least one source watermark in the input data;
    in response to identifying that the at least one source watermark is in the input data, determine an access privilege associated with the at least one source watermark; and
    use the determined access privilege to further determine whether to prevent the release of the input data.

3. The system of claim 1, wherein if the trained machine learning algorithm is trained with the insensitive training data, the trained machine learning algorithm is further trained with the sensitive training data.

4. The system of claim 3, wherein the input data is later determined to not contain the sensitive information and wherein the input data is used to filter out future input data that is the same and/or similar.

5. The system of claim 1, wherein if the trained machine learning algorithm is trained with the sensitive training data, the trained machine learning algorithm is further trained with the insensitive training data.

6. The system of claim 5, wherein the input data is later determined to not contain the sensitive information and wherein the microprocessor readable and executable instructions further cause the microprocessor to:
    add the input data to the insensitive training data; and
    retrain the trained machine learning algorithm using the insensitive training data with the added input data.

7. The system of claim 1, wherein the trained machine learning algorithm comprises a first trained machine learning algorithm and a second trained machine learning algorithm, wherein the first trained machine learning algorithm is trained with the sensitive training data, wherein the second trained machine learning algorithm is trained with the insensitive training data, and wherein determining that the input data contains the sensitive information is based on an output from the first trained machine learning algorithm and an output from the second trained machine learning algorithm.

8. The system of claim 7, wherein the output from the first trained machine learning algorithm is a not match of sensitive information and the output from the second trained machine learning algorithm is a match of insensitive information, and wherein the input data is determined to not contain the sensitive information.

9. The system of claim 7, wherein the output from the first trained machine learning algorithm is a match of sensitive information and/or the output from the second trained machine learning algorithm is not a match of insensitive information, and wherein the input data is determined to contain the sensitive information.

10. The system of claim 9, wherein the input data is later determined to not contain the sensitive information and wherein one or more of the following occurs: the second trained machine learning algorithm is retrained using the input data and the input data is sent to an input filter.

11. The system of claim 10, wherein the second trained machine learning algorithm is retrained using the input data.

12. The system of claim 10, wherein the input data is sent to the input filter.

13. A method, comprising:
receiving, by a trained machine learning algorithm executed by a microprocessor, input data,
    wherein the input data comprises sensitive information and
    wherein the trained machine learning algorithm is trained with at least one of:
      sensitive training data; and
      insensitive training data;
determining, by the trained machine learning algorithm executed by the microprocessor, that the input data contains the sensitive information;
in response to determining that the input data contains the sensitive information, taking an action, by the microprocessor, to prevent release of the input data,
    wherein the input data is to be input into an Artificial Intelligence (AI) algorithm;
determining, by the microprocessor, if an address is a known address of the AI algorithm; and in response to determining whether the address is the known address of the AI algorithm, capturing, by the microprocessor, the input data before the input data is sent to the AI algorithm.

14. The method of claim 13, wherein if the trained machine learning algorithm is trained with the insensitive training data, the trained machine learning algorithm is further trained with the sensitive training data.

15. The method of claim 14, wherein the input data is later determined to not contain the sensitive information, wherein the input data is used to filter out future input data that is the same and/or similar.

16. The method of claim 13, wherein if the trained machine learning algorithm is trained with the sensitive training data, the trained machine learning algorithm is further trained with the insensitive training data.

17. The method of claim 13, wherein the trained machine learning algorithm comprises a first trained machine learning algorithm and a second trained machine learning algorithm, wherein the first trained machine learning algorithm is trained with the sensitive training data, wherein the second trained machine learning algorithm is trained with the insensitive training data, and wherein determining that the input data contains the sensitive information is based on an output from the first trained machine learning algorithm and an output from the second trained machine learning algorithm.

18. The method of claim 17, wherein the output from the first trained machine learning algorithm is a match of sensitive information and/or the output from the second trained machine learning algorithm is not a match of insensitive information, and wherein the input data is determined to contain the sensitive information.

19. A non-transient computer readable medium having stored thereon instructions that cause a microprocessor to execute a method, the method comprising instructions to:

receive, by a trained machine learning algorithm, input data, wherein the input data comprises sensitive information and wherein the trained machine learning algorithm is trained with at least one of:

sensitive training data; and insensitive training data;

determine, by the trained machine learning algorithm, whether the input data contains the sensitive information;

in response to determining that the input data contains the sensitive information, take an action to prevent release of the input data, wherein the input data is to be input into an Artificial Intelligence (AI) algorithm;

determine if an address is a known address of the AI algorithm; and in response to determining whether the address is the known address of the AI algorithm, capture the input data before the input data is sent to the AI algorithm.

20. The method of claim 13, further comprising:

identifying, by the microprocessor, if at least one source watermark in the input data;

in response to identifying that the at least one source watermark is in the input data, determining, by the microprocessor, an access privilege associated with the at least one source watermark; and using, by the microprocessor, the determined access privilege to further determine whether to prevent the release of the input data.

\* \* \* \* \*